US012573378B2

(12) United States Patent
Wang et al.

(10) Patent No.: US 12,573,378 B2
(45) Date of Patent: Mar. 10, 2026

(54) SPEECH TENDENCY CLASSIFICATION

(71) Applicant: Lemon Inc., Grand Cayman (KY)

(72) Inventors: Han Wang, Los Angeles, CA (US);
Hongyu Xiong, Los Angeles, CA (US);
Yiqi Feng, Los Angeles, CA (US);
Yuan Gao, Los Angeles, CA (US);
Xiangyu Zeng, Los Angeles, CA (US);
Rui Li, Los Angeles, CA (US); **Qingyi
Lu, Los Angeles, CA (US); Bin Liu**,
Los Angeles, CA (US)

(73) Assignee: LEMON INC., Grand Cayman (KY)

( * ) Notice: Subject to any disclaimer, the term of this
patent is extended or adjusted under 35
U.S.C. 154(b) by 281 days.

(21) Appl. No.: 17/747,704

(22) Filed: May 18, 2022

(65) Prior Publication Data

US 2023/0377560 A1     Nov. 23, 2023

(51) Int. Cl.
*G10L 15/02* (2006.01)
*G10L 15/04* (2013.01)
(Continued)

(52) U.S. Cl.
CPC .............. *G10L 15/02* (2013.01); *G10L 15/04*
(2013.01); *G10L 17/00* (2013.01); *G10L 25/90*
(2013.01)

(58) Field of Classification Search
None
See application file for complete search history.

(56) References Cited

U.S. PATENT DOCUMENTS 5,895,447 A * 4/1999 Ittycheriah .............. G10L 15/07
704/251
8,554,562 B2 * 10/2013 Aronowitz .............. G10L 17/12
704/250
(Continued)

FOREIGN PATENT DOCUMENTS

CN        101346758 A      1/2009
CN        103544963 A      1/2014
(Continued)

OTHER PUBLICATIONS

Garain et al. "GraNN: feature selection with golden ratio-aided
neural network for emotion, gender and speaker identification from
voice signals". Neural Computing and Applications, published May
8, 2022 (Year: 2022).*

*Primary Examiner* — Jesse S Pullias
(74) *Attorney, Agent, or Firm* — Astute IP Law Group

(57)                ABSTRACT

Embodiments of the present disclosure relate to speech
tendency classification. According to embodiments of the
present disclosure, a method comprises extracting, from a
speech segment, voiceprint information and at least one of
volume information or speaking rate information; determin-
ing, based on the voiceprint information, first probability
information indicating respective first probabilities of a
plurality of tendency categories into which the speech
segment is classified; determining, based on the at least one
of the volume information or the speaking rate information,
second probability information indicating respective second
probabilities of the plurality of tendency categories into
which the speech segment is classified; and determining,
based at least in part on the first probability information and
the second probability information, target probability infor-
mation for the speech segment, the target probability infor-
mation indicating respective target probabilities of the plu-
(Continued)

rality of tendency categories into which the speech segment is classified.

17 Claims, 6 Drawing Sheets

(51) Int. Cl.
    *G10L 17/00*           (2013.01)
    *G10L 25/90*           (2013.01)

(56) References Cited

U.S. PATENT DOCUMENTS

| | | | | |
|---|---|---|---|---|
| 9,047,857 B1 * | 6/2015 | Barton | | G10L 25/48 |
| 2002/0135618 A1 * | 9/2002 | Maes | | G10L 15/24 |
| | | | | 715/767 |
| 2004/0013252 A1 * | 1/2004 | Craner | | H04M 1/247 |
| | | | | 379/142.01 |
| 2007/0071206 A1 * | 3/2007 | Gainsboro | | H04M 3/42221 |
| | | | | 379/168 |
| 2008/0127244 A1 * | 5/2008 | Zhang | | H04N 5/147 |
| | | | | 725/32 |
| 2009/0043573 A1 * | 2/2009 | Weinberg | | G10L 17/06 |
| | | | | 704/223 |
| 2009/0265170 A1 * | 10/2009 | Irie | | G10L 17/26 |
| | | | | 704/236 |
| 2010/0228656 A1 * | 9/2010 | Wasserblat | | G06Q 40/03 |
| | | | | 705/35 |
| 2011/0099011 A1 * | 4/2011 | Jaiswal | | G10L 15/26 |
| | | | | 704/235 |
| 2012/0224021 A1 * | 9/2012 | Begeja | | H04N 7/155 |
| | | | | 348/E7.083 |
| 2013/0016823 A1 * | 1/2013 | Odinak | | H04M 3/5235 |
| | | | | 379/265.02 |
| 2013/0080169 A1 * | 3/2013 | Harada | | G10L 25/63 |
| | | | | 704/E15.001 |
| 2018/0020093 A1 * | 1/2018 | Bentitou | | G10L 13/00 |
| 2018/0068226 A1 * | 3/2018 | O'Connor | | G06F 40/35 |
| 2018/0197547 A1 * | 7/2018 | Shi | | G10L 25/30 |
| 2019/0037081 A1 * | 1/2019 | Rao | | H04M 7/0078 |
| 2019/0378520 A1 * | 12/2019 | Chiu | | G10L 17/26 |
| 2020/0152207 A1 * | 5/2020 | Wang | | G10L 17/18 |
| 2020/0219517 A1 * | 7/2020 | Wang | | G10L 17/02 |

FOREIGN PATENT DOCUMENTS

| | | | | |
|---|---|---|---|---|
| CN | 106228977 A | 12/2016 | | |
| WO | WO-2021169365 A1 * | 9/2021 | | G10L 17/06 |

* cited by examiner

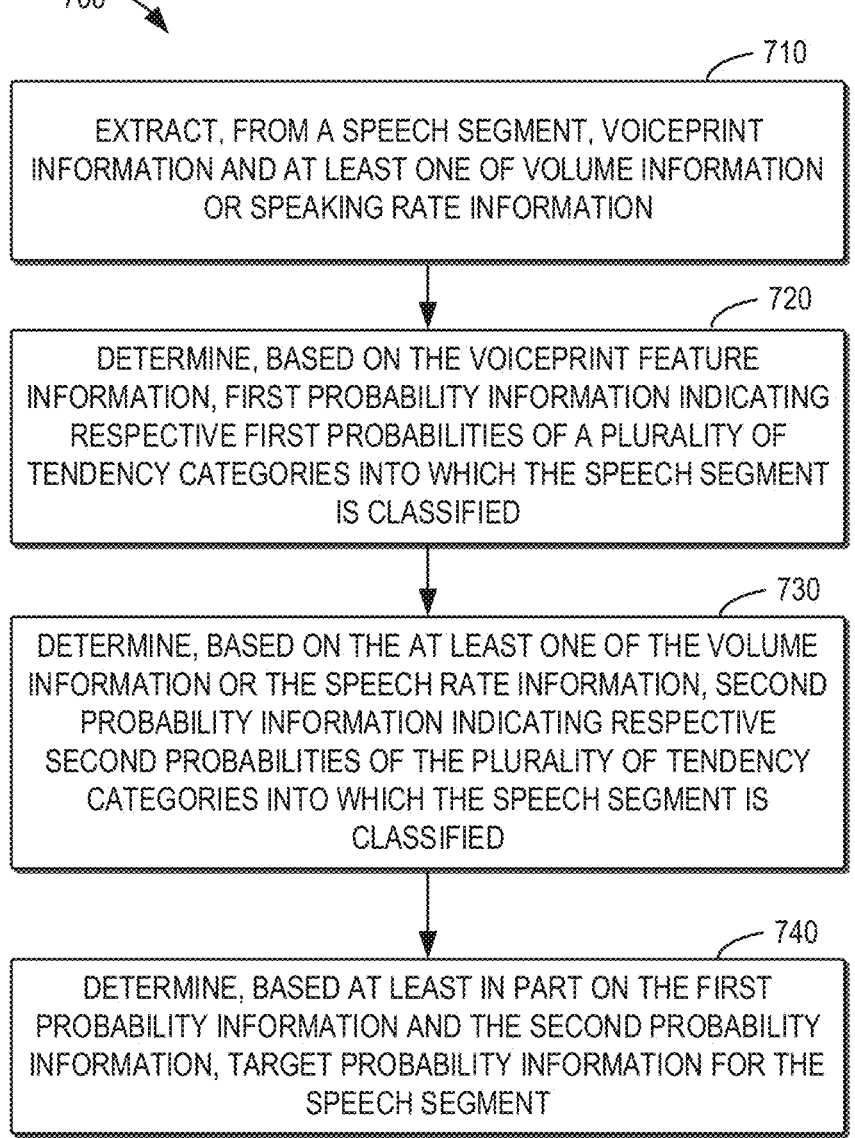

700

710

EXTRACT, FROM A SPEECH SEGMENT, VOICEPRINT INFORMATION AND AT LEAST ONE OF VOLUME INFORMATION OR SPEAKING RATE INFORMATION

720

DETERMINE, BASED ON THE VOICEPRINT FEATURE INFORMATION, FIRST PROBABILITY INFORMATION INDICATING RESPECTIVE FIRST PROBABILITIES OF A PLURALITY OF TENDENCY CATEGORIES INTO WHICH THE SPEECH SEGMENT IS CLASSIFIED

730

DETERMINE, BASED ON THE AT LEAST ONE OF THE VOLUME INFORMATION OR THE SPEECH RATE INFORMATION, SECOND PROBABILITY INFORMATION INDICATING RESPECTIVE SECOND PROBABILITIES OF THE PLURALITY OF TENDENCY CATEGORIES INTO WHICH THE SPEECH SEGMENT IS CLASSIFIED

740

DETERMINE, BASED AT LEAST IN PART ON THE FIRST PROBABILITY INFORMATION AND THE SECOND PROBABILITY INFORMATION, TARGET PROBABILITY INFORMATION FOR THE SPEECH SEGMENT

*FIG. 7*

SPEECH TENDENCY CLASSIFICATION

BACKGROUND

Speech and natural language recognition systems are well known in the art. An automatic speech recognition (ASR) system is to map utterances in a speech file into specific text, also called speech-to-text conversation. In addition to the textual information, the speech also includes non-textual information, such as tendency information, which is also very useful in various applications. The tendency information is an integral component of human speech and can be used as an important feature for the speech. It is thus expected to classify the speech into one of a plurality of predetermined tendency categories.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, where:

FIG. 7 illustrates a flowchart of a process for tendency classification in accordance with some example embodiments of the present disclosure.

DETAILED DESCRIPTION

Figure 1:
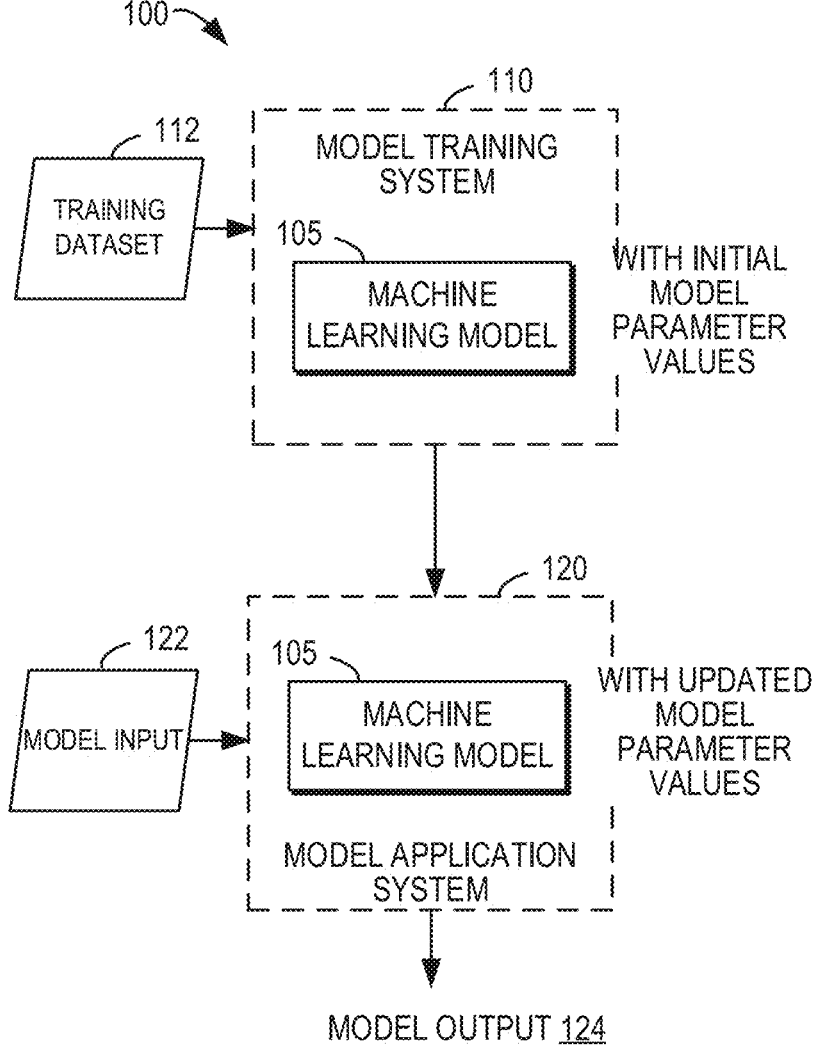
FIG. 1 illustrates a block diagram of an environment in which example embodiments of the present disclosure can be implemented.

Principles of the present disclosure will now be described with reference to some embodiments. It is to be understood that these embodiments are described only for purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for purpose of describing particular embodiments only and is not intended to be limiting example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It should be appreciated that data involved in the present disclosure (including but not limited to the data itself, the acquisition or use of the data) should comply with requirements of corresponding laws and regulations and relevant rules.

It should be appreciated that, before applying the technical solutions disclosed in various implementations of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may be able to decide on his/her own to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also present a select control for the user to choose to "agree" or "disagree" to provide the personal information to the electronic device.

It should be appreciated that the above process of notifying and obtaining the user authorization is only illustrative and does not limit the implementations of the present disclosure. Other methods that satisfy relevant laws and regulations are also applicable to the implementations of the present disclosure.

As used herein, the term "model" is referred to as an association between an input and an output learned from training data, and thus a corresponding output may be generated for a given input after the training. The generation of the model may be based on a machine learning technique. The machine learning techniques may also be referred to as artificial intelligence (AI) techniques. In general, a machine learning model can be built, which receives input information and makes predictions based on the input information. For example, a classification model may predict a class of the input information among a predetermined set of classes. As used herein, "model" may also be referred to as "machine learning model", "learning model", "machine learning network", or "learning network," which are used interchangeably herein.

Generally, machine learning may usually involve three stages, i.e., a training stage, a validation stage, and an application stage (also referred to as an inference stage). At the training stage, a given machine learning model may be trained (or optimized) iteratively using a great amount of training data until the model can obtain, from the training data, consistent inference similar to those that human intelligence can make. During the training, a set of parameter values of the model is iteratively updated until a training objective is reached. Through the training process, the machine learning model may be regarded as being capable of learning the association between the input and the output (also referred to an input-output mapping) from the training data. At the validation stage, a validation input is applied to the trained machine learning model to test whether the model can provide a correct output, so as to determine the performance of the model. At the application stage, the resulting machine learning model may be used to process an actual model input based on the set of parameter values obtained from the training process and to determine the corresponding model output.

FIG. 1 illustrates a block diagram of an environment 100 in which example embodiments of the present disclosure can be implemented. In the environment 100, it is expected to train and apply a machine learning model 105 for a prediction or classification task. The machine learning model 105 may be of any machine learning or deep learning architectures, for example, a neural network.

In practical systems, the machine learning model 105 may be configured to process a model input and generate a model output indicating a prediction or classification result for the model input. The processing task may be defined depending on practical applications where the machine learning model 105 is applied. As an example, in a classification system, the machine learning model 105 may be configured to determine probabilities of a plurality of predetermined categories into which an input is classified.

The machine learning model 105 may be constructed as a function which processes the model input and generates a model output. The machine learning model 105 may be configured with a set of model parameters whose values are to be learned from training data through a training process. In FIG. 1, the model training system 110 is configured to implement the training process to train the machine learning model 105 based on a training dataset 112.

The training dataset 112 may include a large number of model inputs provided to the machine learning model 105 and labeling information indicating corresponding ground-truth outputs for the model inputs. At an initial stage, the machine learning model 105 may be configured with initial model parameter values. During the training process, the initial model parameter values of the machine learning model 105 may be iteratively updated until a learning objective is achieved.

After the training process, the trained machine learning model 105 configured with the updated model parameter values may be provided to the model application system 120 which applies a real-world model input 122 to the machine learning model 105 to output a model output 124 for the model input 122.

In FIG. 1, the model training system 110 and the model application system 120 may be any systems with computing capabilities. It should be appreciated that the components and arrangements in the environment shown in FIG. 1 are only examples, and a computing system suitable for implementing the example implementation described in the subject matter described herein may include one or more different components, other components, and/or different arrangement manners. For example, although shown as separate, the model training system 110 and the model application system 120 may be integrated in the same system or device. The embodiments of the present disclosure are not limited in this respect.

It is expected to recognize non-textual information from the speech, such as tendency information in the speech. Currently there are few works focusing on tendency classification of the speech.

According to embodiments of the present disclosure, there is proposed a solution for tendency classification. According to this solution, certain acoustic features, including voiceprint information, volume information, speaking rate information, and additionally pitch information are extracted from a speech segment to determine respective probabilities of tendency categories into which the speech segment is classified. With the comprehensive utilization of those acoustic features, it is possible to accurately recognize target tendency information based on the resulting probabilities.

To perform tendency classification, it is desirable that a plurality of discrete and different tendency categories can be defined. Then the work is to determine whether a speech segment belongs to any of the plurality of tendency categories. For purpose of better understanding and illustrating the embodiments of the present disclosure, it is first described some example tendency categories that can be defined.

Figure 2:
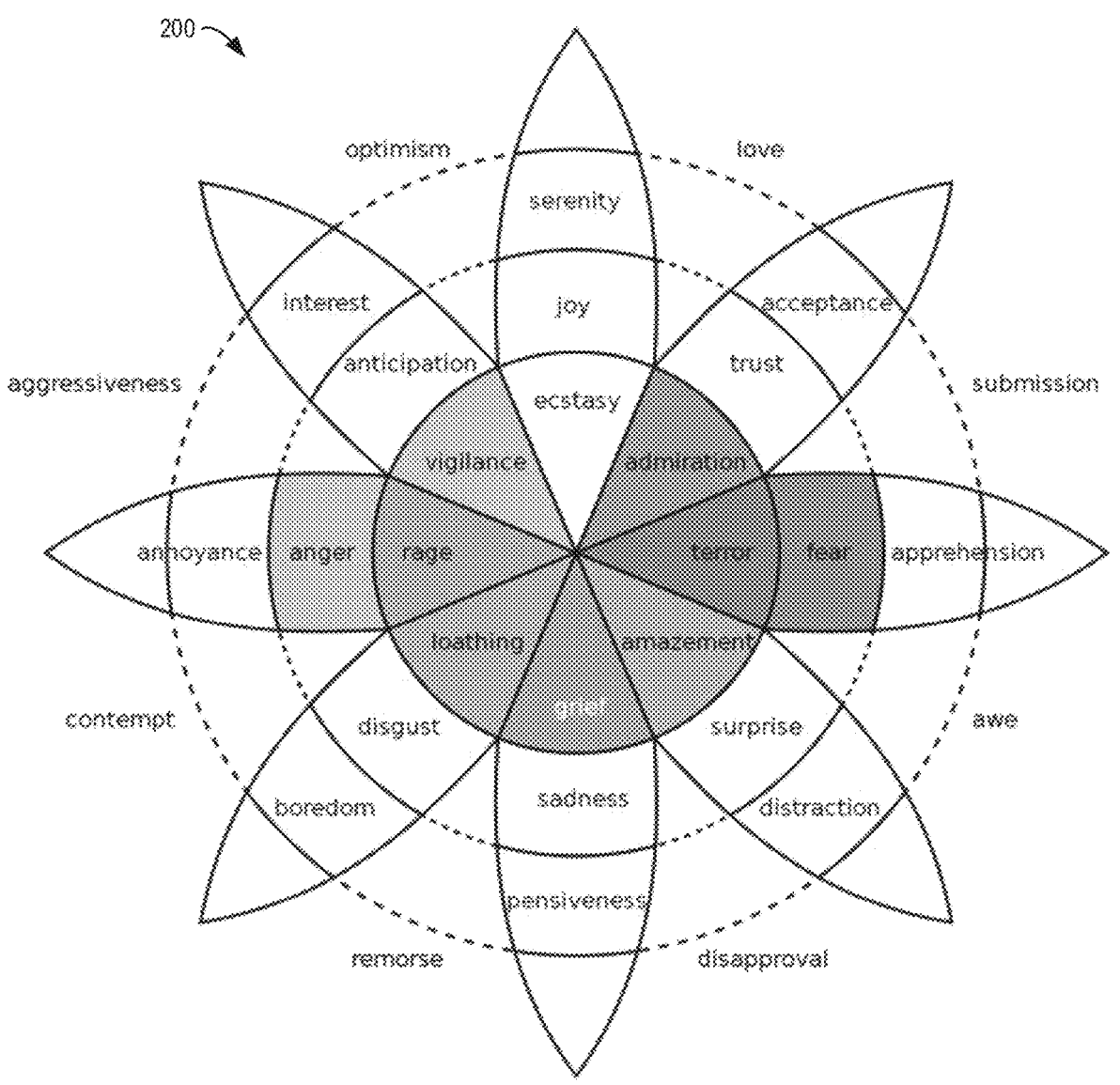
FIG. 2 illustrates an example graph showing definition of tendency categories.

In some embodiments, the tendency classification may be performed in term of emotion tendencies in the speech, and a plurality of tendency categories may be defined based on emotion tendencies. As emotional information is to some extent subjective, there may be various ways to classify the tendency categories. As a concrete example, a plurality of tendency categories may be defined based on the Plutchik Wheel of Emotions. FIG. 2 illustrates an example graph 200 showing definition of tendency categories based on the Plutchik Wheel of Emotions. According to the Wheel of Emotions, there may be eight basic tendency categories, including joy, trust, fear, surprise, sadness, disgust, anger, and anticipation (the eight leaves as illustrated in FIG. 2). Each of the eight basic tendency categories may be subdivided into three tendency categories, and then there may be a total of twenty-four tendency categories. For example, in the "joy" leaf, there are three tendency categories, serenity, joy and ecstasy, which may be considered as a mild sense of "joy", a moderate sense of "joy", and a strong sense of "joy", respectively.

In the following, some example embodiments of the present disclosure will be described on basis of the twenty-four example tendency categories in FIG. 2. However, it would be appreciated that tendency categories may be defined based on other criterion or emotion models, and thus fewer, more, and/or different tendency categories may be included. It would be appreciated that although emotion-based tendency categories are provided herein, the target of the tendency classification is to recognize the overall emotion expressed in or perceived from a speech or speech segment, instead of predicting personal emotion of one or more individuals in the speech or speech segment. The result of the tendency classification can be considered as a feature of the speech or speech segment, which is typically useful in various audio or video analysis tasks.

It would also be appreciated that in some embodiments, the plurality of tendency categories may alternatively or additionally include one or more non-emotional tendency categories, which can be defined according to the requirements in different applications. The scope of the present disclosure is no limited in this regard.

Figure 3:
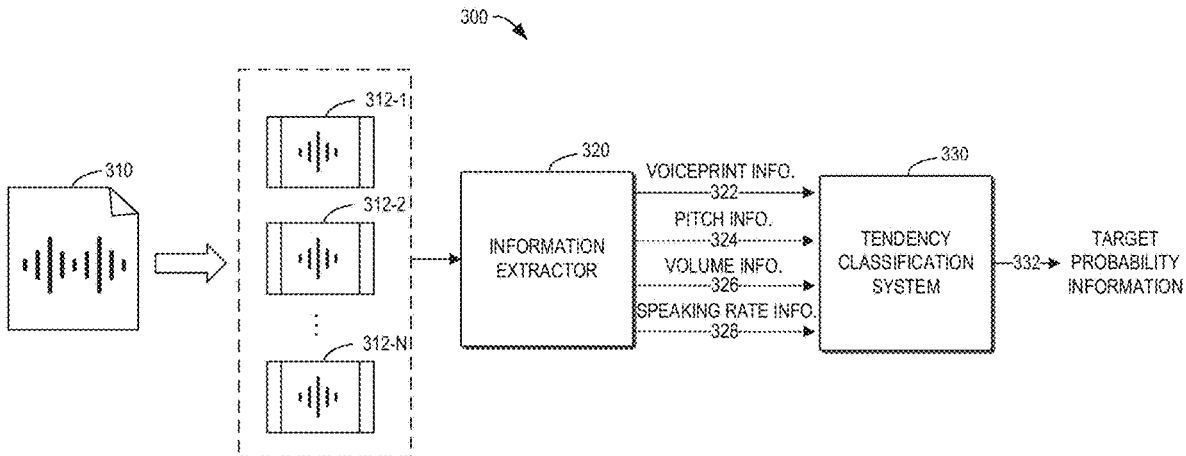
FIG. 3 illustrates a block diagram of example architecture of tendency classification in accordance with some example embodiments of the present disclosure.

FIG. 3 illustrates a block diagram of example architecture 300 of tendency classification in accordance with some example embodiments of the present disclosure. As illustrated, the architecture 300 includes an information extractor 320 and a tendency classification system 330. The information extractor 320 is configured to extract, from a speech segment, acoustic feature information to be used for tendency classification. The tendency classification system 330 is configured to determine target probability information 332 for a speech segment based on the extracted acoustic feature information.

In some embodiments, a speech file 310 is available and segmented into one or more speech segments, including speech segments 312-1, 312-2, . . . , 312-N (where N is an integer larger than or equal to one). In some examples, the speech file 310 may be an audio component of a video. In some examples, the speech file 310 may include speech that is directly recorded.

For purpose of discussion, the speech segments 312-1, 312-2, . . . , 312-N may be collectively or individually referred to as speech segments 312. Various audio or speech segmentation techniques may be applied on the speech file. As a result of the speech segmentation, the speech segments 312 may be of the same or different time duration. Although more than one speech segment is illustrated in FIG. 3, there may be one speech segment 312 divided from the speech file 310.

An individual speech segment 312 may be provided to the information extractor 320 and then the tendency classification system 330. The tendency classification on the plurality of speech segments 312 may be carried on in parallel or in sequence, which is not limited in the scope of the present disclosure. The processing on a speech segment 312 by the information extractor 320 and the tendency classification system 330 will be described below.

According to example embodiments of the present disclosure, for a speech segment 312, the information extractor 320 is configured to extract voice print information 322 from the speech segment 312. In some embodiments, additionally, the information extractor 320 may be further configured to extract at least one of pitch information 324, volume information 326, or speaking rate information 328 from the speech segment 312.

The voiceprint information 322 may indicate an individually distinctive pattern of certain voice characteristics that is spectrographically produced. Generally, the voiceprint of a person may be different from the voiceprints of others. The voiceprint information 322 may be extracted as an acoustic spectrum carrying speech information in the speech segment 312. In some embodiments, the voiceprint information 322 may be expressed as a multi-dimensional vector.

Pitch is the main acoustic correlation of tone and intonation, and it gives the highest peak of the wave by which the tendency classification can be determined. The information extractor 320 may apply fundamental frequency (FO) estimation, also referred as pitch detection, on the speech segment 312 to extract the pitch information 324. The basic period is called the pitch period. The average pitch frequency time pattern, gain, and fluctuation change from one individual speaker to another. A tone in the speech segment 312 may depend on the pitch information 324 in the speech segment 312. A same sentence spoken with different tones may indicate different tendencies. Thus, the pitch information 324 may also be useful in recognizing the potential tendency in the speech segment 312 and thus may be used for the tendency classification.

In some embodiments, the pitch information 324 may be determined based on statistic information on the pitch periods identified from the speech segment 312. As some examples, the pitch information 324 may include one or more of the following: a pitch relative maximum, a pitch relative minimum, a pitch range, a pitch relative position of minimum, a pitch relative absolute area, a pitch maximum gradient, a maximum pitch relative position, a pitch standard deviation, a pitch mean value gradient, a pitch mean value, a pitch mean distance between reversal points, or a pitch standard deviation of distances between reversal points. It would be appreciated that the pitch information 324 may additionally or alternatively include other pitch-related information, which is not limited in the embodiments of the present disclosure.

The volume information 326 may indicate a volume in the speech segment 312. In some embodiments, as the volume may vary in the speech segment 312, the volume information 326 may be extracted as a volume change trajectory over the speech segment 312. In some embodiments, alternatively or in addition, the volume information 326 may be extracted as an average volume in the speech segment 312. The speaking rate information 328 may indicate a speaking rate in the speech segment 312. For example, the speaking rate may be measured in units of words per minutes ("wpm").

The different types of acoustic feature information extracted by the information extractor 320 may be provided to the tendency classification system 330 for further use. In some embodiments, the tendency classification system 330 may be implemented based on the machine learning technique. Specifically, for each type of acoustic feature information, the tendency classification system 330 may include a machine learning model configured to determine probability information based on at least this type of acoustic feature information. The outputs of different machine learning models may be then combined to determine target probability information for the speech segment 312.

Figure 4:
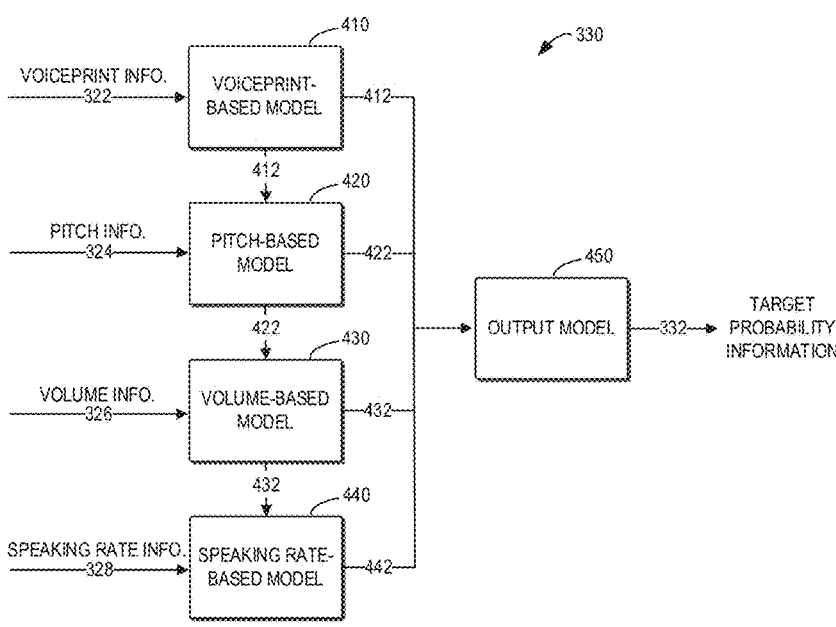
FIG. 4 illustrates a block diagram of an example tendency classification system in accordance with some example embodiments of the present disclosure.

FIG. 4 illustrates a block diagram of an example of the tendency classification system 330 in accordance with some example embodiments of the present disclosure. In this example, for purpose of illustration, the four types of acoustic feature information extracted from a speech segment 312, i.e., the voiceprint information, the pitch information, the volume information, and the speaking rate information, are used in the tendency classification system 330 to determine the target probability information for speech segment 312. Accordingly, the tendency classification system 330 comprises a voiceprint-based model 410 for the voiceprint model 322, a pitch-based model 420 for the pitch information 324, a volume-based model 430 for the volume information 326, and a speaking rate-based model 440 for the speaking rate information 328. The tendency classification system 330 further comprises an output model 450 configured to determine the target probability information 332 for a speech segment 312.

It would be appreciated that in other embodiments, some of the models 410, 420, 430 and 440 may be omitted from the tendency classification system 330 if the corresponding information is not extracted by the information exactor 320. For example, the pitch-based model 420, and/or at least one of the volume-based model 430 or the speaking rate-based model 440 may be omitted from the tendency classification system 330 if the pitch information 324 and/or at least one of the volume information 326 or the speaking rate information 328 are not extracted for use.

In some embodiments, the models 410, 420, 430, and 440 may be configured with nested architecture. The output probability information from one model may be further passed to another model such that the acoustic feature information associated with the one model may be preserved and further used to guide the other model in determining further probability information regarding the plurality of tendency categories.

The voiceprint-based model 410 is configured to determine, based on the voiceprint information 322, probability information 412 indicating respective probabilities of the plurality of tendency categories into which the speech segment 312 is classified. For example, if there are twenty-four tendency categories as illustrated in FIG. 2, the probability information may comprise a 24-dimensional vector, with each element indicating a probability of a corresponding tendency category into which the speech segment 312 is classified. A higher probability may indicate a higher confidence that the speech segment 312 has the corresponding tendency in the category, at least from the perspective of the voiceprint information 322. Otherwise, a lower probability may indicate that there is a lower confidence that the speech segment 312 can be classified into the corresponding tendency category.

As the voiceprint of a person is different from the voiceprints of others, the voiceprint information 322 is useful in tendency classification of a speech segment 312. To determine the potential tendency category into which the speech segment 312 is probably classified, in some embodiments, the voiceprint-based model 410 may be configured to perform voiceprint matching for the voiceprint information 322.

More specifically, the voiceprint-based model 410 may be trained with a plurality of sets of reference voiceprint information. Each set of reference voiceprint information may be extracted from one or more sample speech segments and may be labeled with one of the plurality of tendency categories. The sample speech segments used to extract the sets of reference voiceprint information may contain speeches from different persons and thus may have different voiceprint features. For example, if a sample speech segment contains voice for human navigation, the set of extracted reference voiceprint information may be labeled with a tendency category with no strong emotional senses, such as a tendency category of "serenity." Through the training process, the voiceprint-based model 410 may be learned to perform voiceprint matching based on the plurality of sets of reference voiceprint information.

After the voiceprint information 322 for the speech segment 312 is input, the voiceprint-based model 410 may be configured to match the voiceprint information 322 with the plurality of sets of reference voiceprint information, and determine the first probability information based on a result of the matching. In some embodiments, as the voiceprint information is indicated as a multi-dimensional vector, the voiceprint-based model 410 may be configured to calculate similarity metrics between the vectors for the voiceprint information 322 and the plurality of sets of reference voiceprint information. The voiceprint-based model 410 may determine the probabilities of the plurality of tendency categories based on the corresponding similarity metrics. For a higher similarity metric determined for a set of reference voiceprint information, the probability of a tendency category labeled for this set of reference voiceprint information may be determined as a relatively high value.

In some embodiments, the pitch-based model 420 is configured to determine, based at least in part on the pitch information 324, probability information 422 indicating respective probabilities of the plurality of tendency categories into which the speech segment 312 is classified. The form of the probability information 422 may be similar as the probability information 412.

As mentioned above, the pitch information 324 may comprise one or more of various types of statistic information regarding the pitch periods. For speech segments with different tendency categories, one or more types of the statistic information may be different from each other. The pitch-based model 420 may be trained with corresponding training data to identify which pitch information is related to which tendency category, and thus may be able to determine the probabilities of the tendency categories in a speech segment based on pitch information extracted from this speech segment. The training data may include sample pitch information extracted from sample speech segments and known sample probabilities of tendency categories for those sample speech segments.

As mentioned above, the tendency classification system 330 may be configured with nested architecture such that the output probability information from one model may be further passed to another model. In this case, the pitch-based model 420 may further receive the probability information 412 from the voiceprint-based model 410 and determine the probability information 422 based on both the pitch information 324 and the probability information 412 which is determined based on the voiceprint information 322.

In some embodiments, the volume-based model 430 is configured to determine, based at least in part on the volume information 326, probability information 432 indicating respective probabilities of the plurality of tendency categories into which the speech segment 312 is classified. The form of the probability information 432 may be similar as the probability information 412. In some cases, with the volume information 326 itself, it might be a bit difficult to distinguish the fine and subtle emotion in a speech segment, but the volume of a voice may indicate if the emotion is strong or not. For example, a high volume or a volume with a high variation may indicate a strong emotion, while a low or stable volume may indicate that the emotion is calm.

In some embodiments, a plurality of volume intervals may be defined. As an concrete example, one of the volume intervals may be defined as a soft volume interval, which may include volumes with relatively low values, such as 20-35 dB; another of the volume intervals may be defined as a moderate volume interval, which may include higher volumes than the soft volume interval, such as 35-65 dB; a further one of the volume intervals may be defined as a sonorous volume interval, which may include higher volumes than the moderate volume interval, such as 65-80 dB;

and a noise volume interval may also be defined as, for example, including volumes higher than 80 dB. The voice in the noise volume interval may be considered as noise as it may not express any emotion.

It would be appreciated that the number and the division manner of the volume intervals is provided as a specific example. In other examples, fewer or more volume intervals may be defined and the volume intervals may be divided to have other volume values.

The volume-based model 430 may be configured to compare the volume information 326 with the volume intervals. In some embodiments, if the volume information 326 of the speech segment 312 indicates that a volume in the speech segment is within the volume interval with the highest volumes than other volume intervals, such as the noise volume interval, and such volume continues for a long period of time (for example, longer than a threshold period of time), then the volume-based model 430 may determine that the speech segment 312 may probably contain noise and may not be associated with any tendency category. In this case, the probabilities of the plurality of tendency categories may be determined as low values.

In some embodiments, if the volume information 326 indicates that the volume in the speech segment 312 stays within a volume interval for long period of time (for example, longer than a threshold period of time), then the volume-based model 430 may determine that the speech segment 312 may express a stable tendency in emotion.

In some embodiments, if the volume information 326 indicates that the volume in the speech segment 312 is varied between two adjacent volume intervals (e.g., any two of the above soft, moderate, and sonorous volume intervals), then the volume-based model 430 may determine that the emotion in the speech segment 312 may have some fluctuation or may have a moderate or doctrine characteristic.

In some embodiments, if the volume information 326 indicates that the volume in the speech segment 312 is varied between two or more non-adjacent volume intervals, then the volume-based model 430 may determine that the emotion in the speech segment 312 may run high or may have a large fluctuation.

Depending on the comparing results with the predetermined volume intervals, the volume-based model 430 may determine corresponding probabilities of the plurality of tendency categories into which the speech segment 312 is classified. In some embodiments, the volume-based model 430 may further receive the probability information 422 from the pitch-based model 420 and determine the probability information 432 based on both the volume information 326 and the probability information 422 which is determined based on at least the pitch information 324.

In some embodiments, the speaking rate-based model 440 is configured to determine, based at least in part on the speaking rate information 328, probability information 442 indicating respective probabilities of the plurality of tendency categories into which the speech segment 312 is classified. The form of the probability information 442 may be similar as the probability information 412. In some cases, with the speaking rate information 328 itself, it might be a bit difficult to distinguish the fine and subtle emotion in a speech segment, but the speaking rate may indicate if the emotion is strong or not depending on specific speaking rates. That is, the average speaking rates for different scenes may be varied. For example, the speaking rate in a radio or television broadcast may be higher than the speaking rate in daily conversations.

Some typical average speaking rates in some example scenes may be provided as below. For example, in a scene of presentation, the average speaking rate may be about 100 wpm to 150 wpm; in a scene of conversion, the average speaking rate may be 120 wpm to 150 wpm; in a scene of audiobooks, the average speaking rate may be about 150 wpm to 160 wpm which can help the listeners to carefully listen and speak the words in the books; in a scene of a radio or television broadcast, the average speaking rate may be about 150 wpm to 160 wpm; in a scene of auction, the average speaking rate may be higher, such as about 250 wpm; and in a scene of news commentator, the average speaking rate may be about 250 wpm to 400 wpm.

In a certain scene, a speaking rate higher than the typical average speaking rate may indicate a strong emotion, with a tendency of excitation, agitation, or tense; while a speaking rate lower than the typical average speaking rate may indicate a serious, sad, or confused sense of emotion.

In some embodiments, the typical average speaking rates in a plurality of different scenes may be respectively determined as threshold rate information associated with those scenes, such as the average speaking rates and scenes mentioned above. It would be appreciated that the average speaking rates and the example scenes mentioned above are provided as specific examples. In other examples, fewer or more scenes and their average speaking rates may be defined and used as threshold rate information.

The speaking rate-based model 440 may identify a target scene related to the speech segment 312. The speaking rate-based model 440 may apply various techniques to implement the scene identification. In some examples, if the text is recognized from the speech segment 312, the speaking rate-based model 440 may identify the target scene based on the recognized text, for example, by detecting some keywords, applying semantic analysis, and/or the like. In some examples, if the speech segment 312 is a component of a video, the speaking rate-based model 440 may identify the target scene based on visual information in a video segment corresponding to this speech segment 312. In some other examples, some assistant information associated with the speech file 310 or the current speech segment 312 may also be used to identify the target scene.

With the target scene identified, the speaking rate-based model 440 may determine threshold rate information associated with the target scene and compare the speaking rate information with the threshold rate information. In this way, the speaking rate-based model 440 may determine whether the speaking rate in the speech segment 312 is considered as relatively high or low in the target scene. Depending on the comparing result, the speaking rate-based model 440 may corresponding probabilities of the plurality of tendency categories into which the speech segment 312 is classified. In some embodiments, the speaking rate-based model 440 may further receive the probability information 432 from the volume-based model 430 and determine the probability information 442 based on both the speaking rate information 328 and the probability information 432 which is determined based on at least the pitch information 324.

It would be appreciated that the pass order of the resulting probability information among the models 410, 420, 430, and 440 may be varied if needed. For example, the order of the voiceprint-based model 410 may be changed with any of the pitch-based model 420, the volume-based model 430, or the speaking rate-based model 440. As such, the pitch-based model 420, the volume-based model 430, or the speaking rate-based model 440 may first determine probability information based on the corresponding acoustic feature information and then pass the output probability information to the voiceprint-based model 410 to be used with the voiceprint information 322 in determining probability information.

In some embodiments, instead of providing the resulting probability information, a different type of acoustic feature information may be directly provided to a model for a specific type of acoustic feature information. For example, the pitch-based model 420 may receive the voiceprint information 322 and the pitch information 324 as its input, the volume-based model 430 may receive the voiceprint information 322, the pitch information 324, and the volume information 328 as its input, and so on. One or more other types of acoustic feature information may facilitate a model to determine the probabilities of the tendency categories more accurately.

The outputs (i.e., the probability information) of the models 410, 420, 430, and 440 are provided to the output model 450. The output model 450 is configured to determine the target probability information 332 for the current speech segment 312 based on the probability information provided from the models 410, 420, 430, and 440. The target probability information 332 indicates respective target probabilities of the plurality of tendency categories into which the speech segment 312 is classified.

In some embodiments, the output model 450 may be configured to apply weighted combination on the four types of probability information 412, 422, 432, and 442. As an example, the weighted combination may be performed as follows:

$$P_j = \Sigma(\alpha_k * p_{jk}) \qquad (1)$$

where $\alpha_k$ represents a weight for the probability information associated with the k-th type of acoustic feature information (where k=1, 2, . . . , K, and K depends on the total number of types of acoustic feature information considered in the tendency classification, and K may be 2, 3, or 4 in some examples); $P_{jk}$ represents the probability information provided from the k-th model which utilizes at least the k-th type of acoustic feature information; and $P_j$ represents the probability information output by the k-th model.

It would be appreciated that the probability information determined based on the different types of acoustic feature information may be combined in other ways, and the scope of the present disclosure is not limited in this regard.

Although some example embodiments for determining the probability information in the models 410, 420, 430, 440, and 450 are provided above, it would be appreciated that those models may be configured to determine the probability information based at least on the corresponding acoustic feature information in any other ways.

As the models 410, 420, 430, 440, and 450 may be configured based on machine learning techniques, those models may be trained before those models are applied in the interference stage. The training implementations of those models may be implemented at the model training system 110 of FIG. 1. The applications of those models may be implemented at the model application system 120 of FIG. 1. It is noted that the training data for the models may depend on the input and output of the models. Various training algorithms may be applied and the scope of the present disclosure is not limited in this regard.

In some embodiments, the models 410, 420, 430, and 440 may be individually trained and then are jointly trained together with the output model 450. The weights for the probability information associated with different types of acoustic feature information may then be determined for the model 450.

For each of the speech segments 312 from the speech file 310, corresponding target probability information may be determined by the information extractor 320 and the tendency classification system 330. In some embodiments, the target probability information for the speech segments 312 may be further processed and then used to label the speech segments 312.

Figure 5:
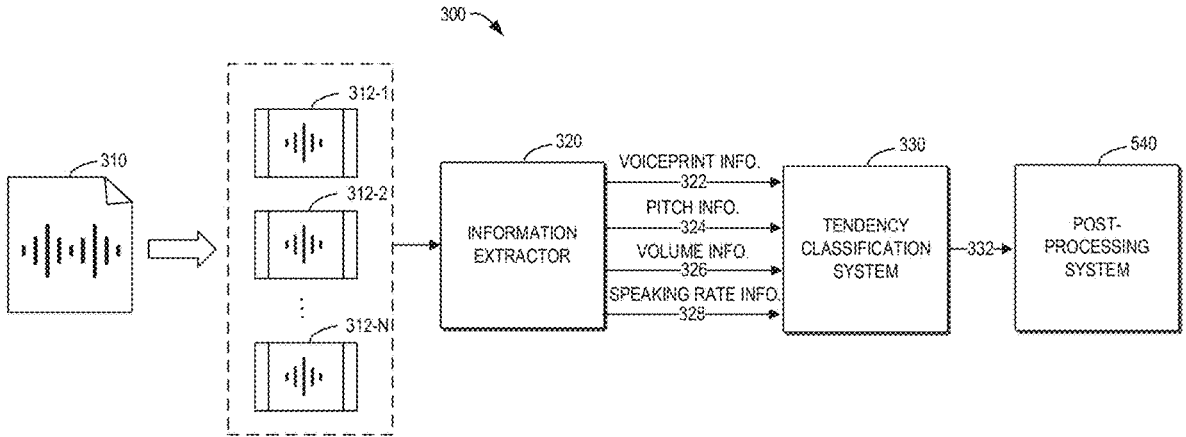
FIG. 5 illustrates a block diagram of example architecture of tendency classification in accordance with some further example embodiments of the present disclosure.

FIG. 5 illustrates a block diagram of example architecture 300 of tendency classification in accordance with some further example embodiments of the present disclosure. In those embodiments, the architecture 300 may further comprise a post-processing system 540. The post-processing system 540 may receive the corresponding target probability information for a plurality of speech segments 312 from the tendency classification system 330 and perform some post-processing operations on the target probability information.

In some embodiments, the post-processing system 540 may label a speech segment 312 with the corresponding target probability information for the plurality of tendency categories. In some embodiments, for a certain speech segment 312, if the target probability information indicates respective target probabilities of the plurality of tendency categories, a target tendency category with the highest target probability may be selected and the speech segment 312 may be labeled with the target tendency category and probably the corresponding target probability.

In some embodiments, the post-processing system 540 may perform aggregation of probability information and/or deletion of sparse probability information. In an embodiment, post-processing system 540 may determine whether a probability difference between the corresponding target probability information for two adjacent speech segments 312 is below a threshold difference (which may be set according to actual requirements in different applications). If the probability difference is below the threshold difference, which means that the tendency category in the two adjacent speech segments 312 may be similar, then the post-processing system 540 may combine the two adjacent speech segments into a combined speech segment and determine combined target probability information for the combined speech segment based on the corresponding target probability information for the two adjacent speech segments 312. As an example, the combined target probability information may be determined by averaging the target probability information for the two adjacent speech segments.

Figure 6:
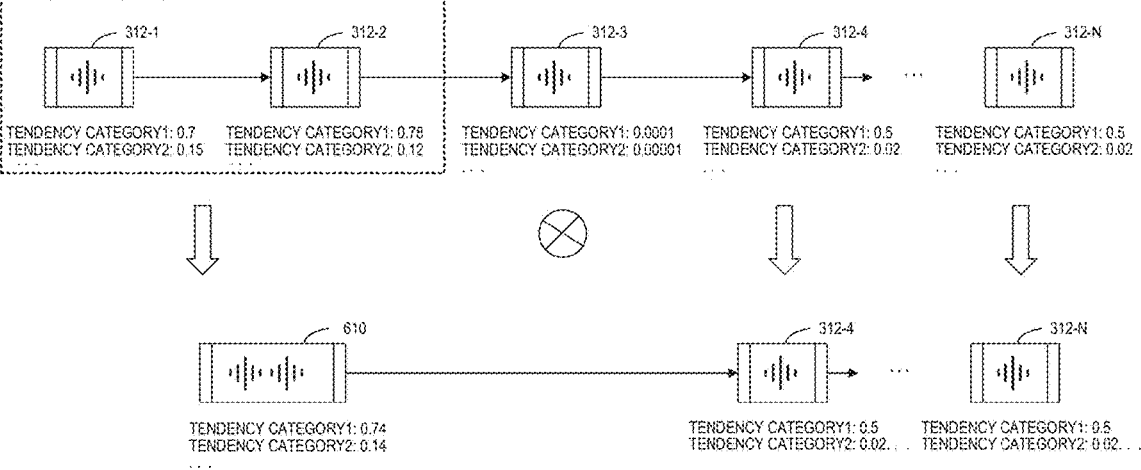
FIG. 6 illustrates an example of post-processing on the target probability information for speech segments in accordance with some example embodiments of the present disclosure.

The post-processing system 540 may further label the combined speech segment with the combined target probability information. For example, the combined speech segment may be labeled with all the probabilities of the tendency categories in the combined target probability information or the tendency category and probably the corresponding target probability. FIG. 6 illustrates an example of post-processing on the target probability information for speech segments in accordance with some example embodiments of the present disclosure. In this example, the post-processing system 540 may determine that the probability difference between the adjacent speech segments 312-1 and 312-2 are low (for example, lower than the threshold difference) because the probabilities of corresponding tendency categories have low differences, e.g., 0.7 and 0.78 for "Tendency Category1," 0.15 and 0.12 for "Tendency Category2," and so on. The post-processing system 540 may then combine the speech segments 312-1 and 312-2 as a combined speech segment 610 and label this combined speech segment 610 with combined target probability information determined from the target probability information for the two speech segments, e.g., 0.74 for "Tendency Category1," 0.14 for "Tendency Category2," and so on.

In some embodiments, if the post-processing system 540 finds that the target probabilities of all the tendency categories in target probability information for a speech segment 312 are all small values (for example, the target probabilities are all below a predefined threshold probability), it may determine that this speech segment 312 is not classified into any of the plurality of predefined tendency categories, for example, the speech segment 312 mostly contains noise. In this case, the post-processing system 540 may not label the speech segment 312 with the corresponding target probability information. In the illustrated example of FIG. 6, the post-processing system 540 may determine that the target probabilities in target probability information for the speech segment 312-3 are all small values. Then the post-processing system 540 may not label the speech segment 312-3 with any tendency category. For other speech segments 312-4, . . . , 312-N in the speech file, the post-processing system 540 may perform similar operations on their target probability information, to decide whether to combine, delete, or maintain the target probability information determined by the tendency classification system 330.

In some embodiments, the tendency categories labeled for the speech segments may be provided for further use, which is not limited in the present disclosure. As an example, the tendency information for a speech segment or a speech file may be used to measure audio or video similarity between two audios or videos. The tendency category information may be applied in many other tasks related to speeches or videos.

FIG. 7 illustrates a flowchart of a process 700 for tendency classification in accordance with some example embodiments of the present disclosure. The process 700 may be implemented at the architecture 300 as illustrated in FIG. 3 or FIG. 5.

At block 710, the architecture 300 (e.g., the information extractor 320) extracts, from a speech segment, voiceprint information and at least one of volume information or speaking rate information.

At block 720, the architecture 300 (e.g., the tendency classification system 330) determines, based on the voiceprint information, first probability information indicating respective first probabilities of a plurality of tendency categories into which the speech segment is classified.

At block 730, the architecture 300 (e.g., the tendency classification system 330) determines, based on the at least one of the volume information or the speaking rate information, second probability information indicating respective second probabilities of the plurality of tendency categories into which the speech segment is classified.

At block 740, the architecture 300 (e.g., the tendency classification system 330) determines, based at least in part on the first probability information and the second probability information, target probability information for the speech segment, the target probability information indicating respective target probabilities of the plurality of tendency categories into which the speech segment is classified.

In some embodiments, the target probability information may be determined by extracting pitch information from the speech segment; determining, based on the pitch information, third probability information indicating respective third probabilities of the plurality of tendency categories into which the speech segment is classified; and determining the target probability information further based on the third probability information.

In some embodiments, the pitch information comprises at least one of the following: a pitch relative maximum, a pitch relative minimum, a pitch range, a pitch relative position of minimum, a pitch relative absolute area, a pitch maximum gradient, a maximum pitch relative position, a pitch standard deviation, a pitch mean value gradient, a pitch mean value, a pitch mean distance between reversal points, or a pitch standard deviation of distances between reversal points.

In some embodiments, the first probability information may be determined by: matching the voiceprint information with a plurality of sets of reference voiceprint information, each of the sets of reference voiceprint information being labeled with one of the plurality of tendency categories; and determining the first probability information based on a result of the matching.

In some embodiments, the second probability information may be determined by: determining the second probability information further based on the first probability information or the voiceprint information.

In some embodiments, the first probability information may be determined by: determining the first probability information further based on the first probability information or the at least one of the volume information or the speaking rate information.

In some embodiments, the second probability information may be determined by: determining the second probability information by determining whether the volume information indicates one of the following: whether a volume in the speech segment is varied between a first volume interval and a second volume interval adjacent to the first volume interval, whether the volume in the speech segment is varied between a third volume interval and a fourth volume interval non-adjacent to the third volume interval, whether the volume in the speech segment is within a fifth volume interval for a first threshold period of time, a lower limit of the fifth volume interval being higher than or equal to an upper limit of the first, second, third, and fourth volume intervals, or whether the volume in the speech segment stays within a sixth volume interval for a second threshold period of time.

In some embodiments, the second probability information may be determined by: identifying a target scene related to the speech segment; and determining the second probability information by comparing the speaking rate information and threshold rate information associated with the target scene.

In some embodiments, the speech segment is one of a plurality of speech segments divided from a speech file, and corresponding target probability information is determined for each of the plurality of speech segments, to indicate respective target probabilities of the plurality of tendency categories into which the speech segment is classified.

In some embodiments, the process 700 further comprises determining whether a probability difference between the corresponding target probability information for two adjacent speech segments of the plurality of speech segments is below a threshold difference; in accordance with a determination that the probability difference is below the threshold difference, combining the two adjacent speech segments into a combined speech segment; determining combined target probability information for the combined speech segment based on the corresponding target probability information for the two adjacent speech segments; and labeling the combined speech segment with the combined target probability information.

In some embodiments, the process 700 further comprises determining whether the respective target probabilities in the corresponding target probability information for one of the plurality of speech segments are below a threshold probability; and in accordance with a determination that the respective target probabilities are below the threshold probability, ceasing to label the speech segment with the corresponding target probability information.

Figure 8:
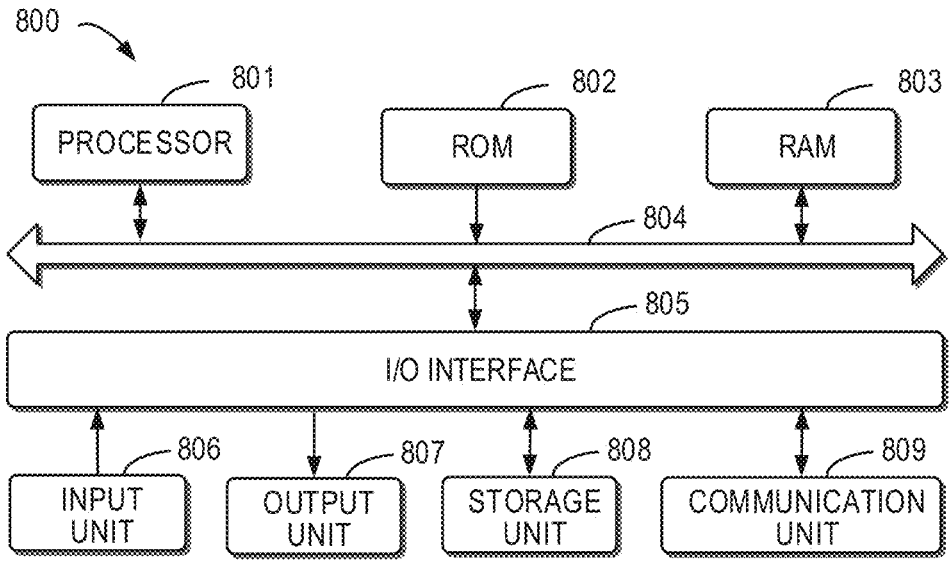
FIG. 8 illustrates a block diagram of an example computing system/device suitable for implementing example embodiments of the present disclosure.

FIG. 8 illustrates a block diagram of an example computing system/device 800 suitable for implementing example embodiments of the present disclosure. The model training system 110 and/or the model application system 120 in FIG. 1 and/or the architecture 300 in FIG. 3 or FIG. 5 may be implemented as or included in the system/device 800. The system/device 800 may be a general-purpose computer, a physical computing device, or a portable electronic device, or may be practiced in distributed cloud computing environments where tasks are performed by remote processing devices that are linked through a communication network. The system/device 800 can be used to implement any of the processes described herein.

As depicted, the system/device 800 includes a processor 801 which is capable of performing various processes according to a program stored in a read only memory (ROM) 802 or a program loaded from a storage unit 808 to a random-access memory (RAM) 803. In the RAM 803, data required when the processor 801 performs the various processes or the like is also stored as required. The processor 801, the ROM 802 and the RAM 803 are connected to one another via a bus 804. An input/output (I/O) interface 805 is also connected to the bus 804.

The processor 801 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 800 may have multiple processors, such as an application-specific integrated circuit chip that is slaved in time to a clock which synchronizes the main processor.

A plurality of components in the system/device 800 are connected to the I/O interface 805, including an input unit 806, such as a keyboard, a mouse, or the like; an output unit 807 including a display such as a cathode ray tube (CRT), a liquid crystal display (LCD), or the like, and a loudspeaker or the like; the storage unit 808, such as disk and optical disk, and the like; and a communication unit 809, such as a network card, a modem, a wireless transceiver, or the like. The communication unit 809 allows the system/device 800 to exchange information/data with other devices via a communication network, such as the Internet, various telecommunication networks, and/or the like.

The methods and processes described above, such as the process 700, can also be performed by the processor 801. In some embodiments, the process 700 can be implemented as a computer software program or a computer program product tangibly included in the computer readable medium, e.g., storage unit 808. In some embodiments, the computer program can be partially or fully loaded and/or embodied to the system/device 800 via ROM 802 and/or communication unit 809. The computer program includes computer executable instructions that are executed by the associated processor 801. When the computer program is loaded to RAM 803 and executed by the processor 801, one or more acts of the process 700 described above can be implemented. Alternatively, processor 801 can be configured via any other suitable manners (e.g., by means of firmware) to execute the process 700 in other embodiments.

In some example embodiments of the present disclosure, there is provided a computer program product comprising instructions which, when executed by a processor of an apparatus, cause the apparatus to perform steps of any one of the methods described above.

In some example embodiments of the present disclosure, there is provided a computer readable medium comprising program instructions for causing an apparatus to perform at least steps of any one of the methods described above. The computer readable medium may be a non-transitory computer readable medium in some embodiments.

In an eighth aspect, example embodiments of the present disclosure provide a computer readable medium comprising program instructions for causing an apparatus to perform at least the method in the second aspect described above. The computer readable medium may be a non-transitory computer readable medium in some embodiments.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present disclosure are illustrated and described as block diagrams, flowcharts, or using some other pictorial representations, it will be appreciated that the blocks, apparatuses, systems, techniques, or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods/processes as described above. Generally, program modules include routines, programs, libraries, objects, classes, components, data structures, or the like that perform particular tasks or implement particular abstract types. The functionality of the program modules may be combined or split between program modules as desired in various embodiments. Computer-executable instructions for program modules may be executed within a local or distributed device. In a distributed device, program modules may be located in both local and remote storage media.

The computer readable medium may be a computer readable signal medium or a computer readable storage medium. A computer readable medium may include but is not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods disclosed herein may be written in any combination of one or more programming languages. The program code may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server. The program code may be distributed on specially-programmed devices which may be generally referred to herein as "modules". Software component portions of the modules may be written in any computer language and may be a portion of a monolithic code base, or may be developed in more discrete code portions, such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

While operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
  extracting, from a speech segment, voiceprint information and at least one of volume information or speaking rate information;
  determining, based on the voiceprint information, first probability information indicating respective first probabilities of a plurality of emotion tendency categories into which the speech segment is classified;
  determining, based on the first probability information and the at least one of the volume information or the speaking rate information, second probability information indicating respective second probabilities of the plurality of emotion tendency categories into which the speech segment is classified; and
  determining, based at least in part on the first probability information and the second probability information, target probability information for the speech segment, the target probability information indicating respective target probabilities of the plurality of emotion tendency categories into which the speech segment is classified, wherein determining the first probability information comprises:
  matching the voiceprint information with a plurality of sets of reference voiceprint information, each of the sets of reference voiceprint information being labeled with one of the plurality of emotion tendency categories, comprising:
    calculating similarity metrics between vectors for the voiceprint information and the plurality of sets of reference voiceprint information, and determining the respective first probabilities of the plurality of emotion tendency categories based on corresponding similarity metrics; and
  determining the first probability information based on a result of the matching.

2. The method of claim 1, wherein determining the target probability information comprises:
  extracting pitch information from the speech segment;
  determining, based on the pitch information, third probability information indicating respective third probabilities of the plurality of emotion tendency categories into which the speech segment is classified; and
  determining the target probability information further based on the third probability information.

3. The method of claim 2, wherein the pitch information comprises at least one of the following:
  a pitch relative maximum,
  a pitch relative minimum,
  a pitch range,
  a pitch relative position of minimum,
  a pitch relative absolute area,
  a pitch maximum gradient,
  a maximum pitch relative position,
  a pitch standard deviation,
  a pitch mean value gradient,
  a pitch mean value,
  a pitch mean distance between reversal points, or
  a pitch standard deviation of distances between reversal points.

4. The method of claim 1, wherein determining the first probability information comprises:
  determining the first probability information further based on the first probability information or the at least one of the volume information or the speaking rate information.

5. The method of claim 1, wherein determining the second probability information comprises:
  identifying a target scene related to the speech segment; and
  determining the second probability information by comparing the speaking rate information and threshold rate information associated with the target scene.

6. The method of claim 1, wherein the speech segment is one of a plurality of speech segments divided from a speech file, and corresponding target probability information is determined for each of the plurality of speech segments, to indicate respective target probabilities of the plurality of emotion tendency categories into which the speech segment is classified.

7. The method of claim 6, further comprising:
  determining whether a probability difference between the corresponding target probability information for two adjacent speech segments of the plurality of speech segments is below a threshold difference;

in accordance with a determination that the probability difference is below the threshold difference, combining the two adjacent speech segments into a combined speech segment;

determining combined target probability information for the combined speech segment based on the corresponding target probability information for the two adjacent speech segments; and labeling the combined speech segment with the combined target probability information.

8. The method of claim 6, further comprising:

determining whether the respective target probabilities in the corresponding target probability information for one of the plurality of speech segments are below a threshold probability; and in accordance with a determination that the respective target probabilities are below the threshold probability, ceasing to label the speech segment with the corresponding target probability information.

9. The method of claim 1, wherein determining the second probability information comprises:

determining the second probability information by determining whether the volume information indicates one of the following:

whether a volume in the speech segment is varied between a first volume interval and a second volume interval adjacent to the first volume interval, whether the volume in the speech segment is varied between a third volume interval and a fourth volume interval non-adjacent to the third volume interval, whether the volume in the speech segment is within a fifth volume interval for a first threshold period of time, a lower limit of the fifth volume interval being higher than or equal to an upper limit of the first, second, third, and fourth volume intervals, or whether the volume in the speech segment stays within a sixth volume interval for a second threshold period of time.

10. A system, comprising:

at least one processor; and at least one memory communicatively coupled to the at least one processor and comprising computer-readable instructions that, upon execution by the at least one processor, cause the at least one processor to perform acts comprising:

extracting, from a speech segment, voiceprint information and at least one of volume information or speaking rate information;

determining, based on the voiceprint information, first probability information indicating respective first probabilities of a plurality of emotion tendency categories into which the speech segment is classified;

determining, based on the first probability information and the at least one of the volume information or the speaking rate information, second probability information indicating respective second probabilities of the plurality of emotion tendency categories into which the speech segment is classified; and determining, based at least in part on the first probability information and the second probability information, target probability information for the speech segment, the target probability information indicating respective target probabilities of the plurality of emotion tendency categories into which the speech segment is classified, wherein determining the first probability information comprises:

matching the voiceprint information with a plurality of sets of reference voiceprint information, each of the sets of reference voiceprint information being labeled with one of the plurality of emotion tendency categories, comprising:

calculating similarity metrics between vectors for the voiceprint information and the plurality of sets of reference voiceprint information, and determining the respective first probabilities of the plurality of emotion tendency categories based on corresponding similarity metrics; and determining the first probability information based on a result of the matching.

11. The system of claim 10, wherein determining the target probability information comprises:

extracting pitch information from the speech segment;

determining, based on the pitch information, third probability information indicating respective third probabilities of the plurality of emotion tendency categories into which the speech segment is classified; and determining the target probability information further based on the third probability information.

12. The system of claim 10, wherein determining the second probability information comprises:

identifying a target scene related to the speech segment; and determining the second probability information by comparing the speaking rate information and threshold rate information associated with the target scene.

13. The system of claim 10, wherein the speech segment is one of a plurality of speech segments divided from a speech file, and corresponding target probability information is determined for each of the plurality of speech segments, to indicate respective target probabilities of the plurality of emotion tendency categories into which the speech segment is classified.

14. The system of claim 13, wherein the acts further comprise;

determining whether a probability difference between the corresponding target probability information for two adjacent speech segments of the plurality of speech segments is below a threshold difference;

in accordance with a determination that the probability difference is below the threshold difference, combining the two adjacent speech segments into a combined speech segment;

determining combined target probability information for the combined speech segment based on the corresponding target probability information for the two adjacent speech segments; and labeling the combined speech segment with the combined target probability information.

15. The system of claim 13, wherein the acts further comprise:

determining whether the respective target probabilities in the corresponding target probability information for one of the plurality of speech segments are below a threshold probability; and in accordance with a determination that the respective target probabilities are below the threshold probability, ceasing to label the speech segment with the corresponding target probability information.

16. The system of claim 10, wherein determining the second probability information comprises:

determining the second probability information by determining whether the volume information indicates one of the following:

whether a volume in the speech segment is varied between a first volume interval and a second volume interval adjacent to the first volume interval, whether the volume in the speech segment is varied between a third volume interval and a fourth volume interval non-adjacent to the third volume interval, whether the volume in the speech segment is within a fifth volume interval for a first threshold period of time, a lower limit of the fifth volume interval being higher than or equal to an upper limit of the first, second, third, and fourth volume intervals, or whether the volume in the speech segment stays within a sixth volume interval for a second threshold period of time.

17. A non-transitory computer-readable storage medium, storing computer-readable instructions that upon execution by a computing device cause the computing device to perform acts comprising:

extracting, from a speech segment, voiceprint information and at least one of volume information or speaking rate information;

determining, based on the voiceprint information, first probability information indicating respective first probabilities of a plurality of emotion tendency categories into which the speech segment is classified;

determining, based on the first probability information and the at least one of the volume information or the speaking rate information, second probability information indicating respective second probabilities of the plurality of emotion tendency categories into which the speech segment is classified; and determining, based at least in part on the first probability information and the second probability information, target probability information for the speech segment, the target probability information indicating respective target probabilities of the plurality of emotion tendency categories into which the speech segment is classified, wherein determining the first probability information comprises:

matching the voiceprint information with a plurality of sets of reference voiceprint information, each of the sets of reference voiceprint information being labeled with one of the plurality of emotion tendency categories, comprising:

calculating similarity metrics between vectors for the voiceprint information and the plurality of sets of reference voiceprint information, and determining the respective first probabilities of the plurality of emotion tendency categories based on corresponding similarity metrics; and determining the first probability information based on a result of the matching.

* * * * *